United States Patent [19]

Wiegand et al.

[11] 4,070,287

[45] Jan. 24, 1978

[54] POLYMERIC AND CELLULOSIC FIBER MATERIAL FOR REMOVING OIL FROM WATER

[75] Inventors: Donald E. Wiegand, Minneapolis; Frederick H. Riedel, Cloquet; Otis R. Videen, St. Paul, all of Minn.

[73] Assignee: Conweb Corporation, St. Paul, Minn.

[21] Appl. No.: 723,089

[22] Filed: Sept. 14, 1976

[51] Int. Cl.$^2$ ............................................. E02B 15/04
[52] U.S. Cl. ..................................... 210/40; 210/505; 210/DIG. 26; 252/427
[58] Field of Search ............... 210/36, 40, 39, 41, 210/DIG. 26, DIG. 27, 504, 505, 507; 55/524, 528; 428/252; 252/426, 427; 162/146, 147, 100, 157 R

[56] References Cited

U.S. PATENT DOCUMENTS

| | | | |
|---|---|---|---|
| 3,371,468 | 3/1968 | Shropshire | 210/505 X |
| 3,494,863 | 2/1970 | Greenman | 210/41 |
| 3,617,566 | 11/1971 | Oshima | 210/DIG. 26 |
| 3,630,891 | 12/1971 | Peterson | 210/36 |
| 3,764,527 | 10/1973 | Sohl | 210/40 |
| 3,770,575 | 11/1973 | Ball | 162/100 |
| 3,795,575 | 3/1974 | Gouw | 162/157 R |
| 3,960,722 | 6/1976 | Tomikawa | 210/36 |

*Primary Examiner*—John Adee
*Attorney, Agent, or Firm*—Eyre, Mann, Lucas & Just

[57] ABSTRACT

Material comprising blends of polymeric and cellulosic fibers is disclosed which is particularly suited for removing oil from aqueous mixtures thereof. The fibers are binded into a web or mat-like structure or blended in an unbonded form and retained by a fine mesh net-like enclosure. The polymeric fiber may be a foamed fiber and a method for producing foamed polymeric fibers is disclosed.

12 Claims, No Drawings

POLYMERIC AND CELLULOSIC FIBER MATERIAL FOR REMOVING OIL FROM WATER

The present invention relates to sorbent materials for removing oil from aqueous mixtures thereof.

Increasing concern over pollution of water by oil and the need in industry to economically and practically remove oil from water has prompted disclosure of many inventions in this field, as evidenced by the following U.S. Pat. Nos. 3,764,527; 3,147,216; 3,520,806; 3,518,183; 3,536,616; and 3,630,891. Typical of the liquids immiscible with water are the many different types of liquid hydrocarbons including but not limited to gasoline; kerosenes, light oils, heavy oils, jet fuel, petroleum, asphalt and paraffin crudes, diesel oil, naphtha, water immiscible ketones, aromatic solvents such as benzene, toluene and xylene, terpenes, esters, phenols, aldehydes, amides, amines, mercaptans, fatty acids, fatty acid esters, halohydrocarbons, polar organic compounds, and the like and these compounds will hereinafter be represented by oil, the most common polluter.

In the known methods for removing oil from the surface of water or other substrate wherein specified materials are contacted with the oil film floating on the substrate surface, it is an important object that the specified materials sorb the greatest amount of oil possible. It is known that many synthetic polymers have excellent buoyancy and an affinity for oil over water, and that unsized cellulosic fibers have as much affinity for oil as water. Cellulosic fibers sized to preferentially sorb oil over water are generally not as buoyant as the polymeric fibers. However, it has now been found that specified mixtures of a primary material comprising polymeric fibers and a secondary material comprising a blend of sized and unsized cellulosic fibers sorb increased quantities of oil per unit of measure over purely polymeric materials without having deleterious effects on structure buoyancy.

In accordance with the present invention, material comprising a blend of polymeric fibers and cellulosic fibers is formed into a bonded or unbonded web or mat-like structure or merely blended and inserted into a fine mesh net-like enclosure. The primary material comprising polymeric fiber is suitable less than 75 microns in diameter and is preferably of less than 40 microns in diameter. It may be produced by extruding a polymeric melt through a heated orifice and then attenuating the extrudate with a blast of hot gas to produce the said diameter fibers. Further details of the extrusion and melt spinning fiberizing processes are known to those skilled in the art. Moreover, the polymeric fibers may be produced by other processes known in the art such as from slit film, split film ribbons, and drawn monofilaments. It has also been found that ground or shredded polymeric materials such as ground polyethylene foam are also suitable as the primary polymeric fiber. The polymeric material preferably comprises a polyolefin, preferably polyethylene. Other suitable polymeric materials include polypropylene, polystyrene, polycarbonate, polyester, polyethylene terephthalate, poly(4-methyl-pentene-1), poly(tetramethylene terephthalate) and nylon as well as combinations thereof and combinations with polyethylene. Other polymeric materials and combinations are known to those skilled in the art.

The secondary material comprising cellulosic fiber preferably comprises wood fiber, which is preferably a chemical sulfite wood fiber produced by fiberizing a pulp sheet. Methods for fiberizing pulp sheets, for example, in a hammermill, are known to those skilled in the art. Advantageously, suitable secondary cellulosic fibers include wastes such as fiberized wood waste, screenings, cotton, linters, kraft pulp, kraft waste, newsprint, and diaper waste, and other fiberized inexpensive and plentiful materials such as defibrated raw jackpine and aspen wood fiber. Part or all of the cellulosic fiber may be sized with a water repellent material; sizing of cellulosic fibers is known in the art and is disclosed, for example, in U.S. Pat. No. 3,630,891.

In accordance with the present invention, the polymeric and cellulosic fibers may be combined into a bonded mat-like structure by known processees, for example, as disclosed in U.S. Pat. No. 2,746,895. Suitable binders are known to those skilled in the art and are preferably not deleteriously affected by water or hydrocarbons. For this reason, thermoset binders (phenols, melamines, etc.) are preferred. Dependent on the length and amount of the polymeric fibers in the structure, sufficient entanglement may be achieved to eliminate the need for a binder or at most only a small amount of binder to prevent sift out of the shorter cellulosic fibers. However, the polymeric and cellulosic fibers may also be loosely blended into an unbonded structure which is retained by a fine mesh net-like enclosure suitably a bag or a boom. The mesh size of the enclosure is not overly critical but it is important that the mesh openings be large enough to permit the flow of liquid thereinto while at the same time being small enough to retain the fibers within the enclosure. It will be appreciated that the escape of a small portion of the fibers will not be detrimental. It will similarly be appreciated that if the fibers are bonded together into larger structures, e.g., 2 inch by 2 inch by ½ inch thick squares, the mesh size need only be small enough to retain the fibers in the bonded form. The bonded mat-like structure finds particular use in a method for removing oil from the surface of a substrate wherein the mat-like structure is contacted with the oil and thereafter removed when the oil is sorbed by the mat-like structure. Where the substrate is liquid, and water in particular, the mat-like structure is of a character to permit it to float on the surface of the liquid or water. The unbonded structure retained in a net-like structure or bag finds particular use in methods for removing oil from the surface of a liquid wherein the oil is contacted by floating oil sorbent booms formed by the filled net-like structures or bags which are thereafter removed when oil is sorbed thereby. Use of ground polymeric fiber-like material is especially advantageous for material according to the invention which is to be formed into booms or which is to otherwise float because of the increased buoyancy thereof.

In oil separating methods which float sorbent material on an aqueous mixture, a significant technological advance is achieved by reducing the overall density of the sorbent material according to the present invention while substantially maintaining its oil sorbing capability. As described hereinbefore, one way to accomplish this is to use ground polymeric foam. However, a further reduction in density and increase in oil sorbing capability is realizable by using a foamed polymeric fiber as the primary material. According to the present invention, such foam fibers may be produced by extruding a thermoplastic resin in the presence of a blowing agent, the blowing agent being introduced in the melt prior to the extruder orifice, which is preferably heated. The resulting extrudate is essentially a foamed fiber having a density which is less than the base density of the thermoplastic resin. Densities of considerably less than 52 pounds per cubic foot and as low as about two pounds per cubic foot are realizable using polyethylene resin. Properties of mat formed according to the invention comprising foamed fibers can be further enhanced by the selection of suitable blowing agents, residual chemicals of which are entrained in the mat to contribute secondary functional properties thereto such as fire retardancy.

In addition to the advantages described hereinbefore relating to increased oil sorbency and reduced density, sorbent material mat-like structures according to the present invention have the further advantage of increased physical strength since the longer polymeric fibers provide an excellent matrix for retaining the shorter cellulosic fibers.

According to the present invention, polymeric fiber, cellulosic fiber, and binders are combined as follows:
25–90% by weight of polymeric fiber of less than 40 microns diameter; 5–70% by weight of cellulosic fiber; and up to 15% by weight binders.

Further in accordance with the present invention, polymeric foamed fiber, cellulosic fiber, and binders are combined as follows:
25–90% by weight of polymeric foamed fibers; 5–70% by weight of cellulosic fiber; and up to 15% by weight of binders.

With respect to the net-like structure according to the invention, polymeric and cellulosic fiber are blended as follows:
25–95% by weight of polymeric fiber of less than 40 microns diameter; and 5–75% by weight of cellulosic fiber.

It will be appreciated that in the above combinations and in all following examples that the cellulosic fiber portion may consist of a blend of sized and unsized cellulosic fibers in about equal portions. Unsized fiber is desirable especially where bonding agents are used to permit better binder attachment and bonding strength. Sized fibers tend to form weaker bonds. It is preferred that the cellulosic fibers be at least 25% unsized fibers and at least 25% sized fibers. It must be understood, however, that in certain applications the cellulosic fibers could all be sized or none could be sized. Where cellulosic fibers are sized in the Examples, this has been done utilizing the formulation of U.S. Pat. No. 2,754,206 identified as Formula No. 1.

The mat-like structures and net-like structures are tested and observed to sorb more oil per unit of measure than a corresponding structure containing polymeric fibers to the exclusion of cellulosic fibers with no deleterious effects on structure buoyancy.

The present invention is illustrated but not limited by the following examples.

EXAMPLE 1

A 1 inch thick mat-like structure having a density of between 2 and 4 pounds per cubic foot is produced from a blend of polymeric fibers and cellulosic fibers and binders as follows:

Polyethylene fiber of less than 40 microns diameter. About 25% by weight
Sulfite wood fiber. (50% sized, 50% unsized). About 68% by weight
Polyvinyl acetate binder. About 7% by weight.

The mat-like structure is tested and observed to sorb more oil per unit of measure than a corresponding mat-like structure containing polymeric fibers to the exclusion of the cellulosic fibers with no deleterious effects on structure buoyancy. Similar results are obtained using polypropylene fiber.

EXAMPLE 2

A 1 inch thick mat-like structure having a density of between 2 and 4 pounds per cubic foot is produced from a blend of polymeric fibers and cellulosic fibers and binders as follows:

Polyethylene fiber of less than 40 microns diameter. About 80% by weight
Sulfite wood fiber, unsized. About 5% by weight
Phenolic binder. About 15% by weight.

The mat-like structure is tested and observed to sorb more oil per unit of measure than a corresponding mat-like structure containing polymeric fibers to the exclusion of sized cellulosic fibers with no deleterious effects on structure buoyancy. Similar results are obtained using polypropylene fiber.

EXAMPLE 3

An approximately 8 inch diameter by 72 inch long tubular net-like structure is filled with a blend of polymeric fibers and cellulosic fibers as follows:

Ground polyethylene foam fiber of about 60 microns fiber diameter. About 75% by weight
Sulfite wood fiber, sized. About 25% by weight.

The next-like structure is tested and observed to sorb more oil per unit of measure than a corresponding net-like structure containing polymeric fibers to the exclusion of sized cellulosic fibers with no deleterious effects on structure buoyancy.

EXAMPLE 4

A ½ inch thick mat-like structure having a density of between 2 and 6 pounds per cubic foot is produced from a blend of polymeric foamed fibers, cellulosic fibers and binders as follows:

Polyethylene foamed fibers. About 90% by weight
Sulfite wood fiber, unsized. About 5% by weight
Melamine binder. About 5% by weight.

The mat-like structure is tested and observed to sorb more oil per unit of measure than a corresponding mat-like structure containing polymeric fibers to the exclusion of sized cellulosic fibers with no deleterious effects on structure buoyancy.

The advantages of the present invention, as well as certain changes and modifications of the disclosed embodiment thereof, will be readily apparent to those skilled in the art. It is the applicant's intention to cover by his claims all those changes and modifications which could be made to the embodiment of the invention herein chosen for the purposes of the disclosure without departing from the spirit and scope of the invention.

What is claimed is:

1. Sorbent material preferentially sorptive of liquid hydrocarbons over an aqueous liquid comprising a blend of:

a. from about 25% to about 90% by weight of polymeric fibers, said fibers being less than about 40 microns in diameter and being of a material selected from the group consisting of polyethylene, polypropylene, polystyrene, polycarbonate, polyester, polyethylene terephthalate, poly(4-methylpentene-1), poly(tetramethyleneterephthalate);
b. from about 5% to about 70% by weight of cellulosic fibers, said cellulosic fibers comprising:
  i. at least about 25% unsized cellulosic fibers;
  ii. at least about 25% cellulosic fibers sized with a water repellent material;
c. from about 5% to about 15% of a binding agent capable of bonding the fibers together and not deleteriously affected by water or the liquid hydrocarbon to be sorbed; said sorbent material having a density no greater than about ten pounds per cubic foot.

2. Sorbent structure comprising in an enclosure a sorbent material preferentially sorptive of liquid hydrocarbons over aqueous liquid comprising a blend of:
a. from about 25% to about 95% by weight of polymeric fibers, said fibers being less than about 40 mircons in diameter and being of a material selected from the group consisting of polyethylene, polypropylene, polystyrene, polycarbonate, polyester, polyethylene terephthalate, poly(4-methylpentene-1), poly(tetramethylene-terephthalate);
b. from about 5% to about 75% by weight of cellulosic fibers, said cellulosic fibers comprising:
  i. at least about 25% unsized cellulosic fibers;
  ii. at least about 25% cellulosic fibers sized with a water repellent material;
said blend being contained in a fine mesh net-like enclosure, the size of the mesh being great enough to permit flow of liquid therethrough and being fine enough to retain said fiber blend therein.

3. The sorbent structure of claim 2 wherein the sorbent material further includes from about 5% to about 15% by weight binder.

4. A process for preferentially sorbing liquid hydrocarbons from an aqueous liquid comprising:
a. contacting said liquid hydrocarbon with sorbent material, said sorbent material comprising a blend of from about 25% to about 95% by weight polymeric fiber and from about 5% to about 75% by weight cellulosic fiber said material having a density no greater than about ten pounds per cubic foot; and
b. separating the sorbent material with the sorbed liquid hydrocarbon from the aqueous liquid.

5. The process of claim 4 wherein the polymeric fiber and cellulosic fiber blend is bonded into a mat-like structure.

6. The process of claim 4 wherein the polymeric fiber is from the group consisting of aromatic and aliphatic polyolefins, polyesters and combinations thereof.

7. The process of claim 4 wherein the cellulosic fiber is from the group consisting of sulfite wood fiber, fiberized wood wastes, screenings, cotton linters, kraft pulp, kraft waste, newsprint, diaper waste, and defibrated raw jackpine and aspen wood fiber and combinations thereof.

8. The process of claim 4 wherein the polymeric fibers comprise foam fibers.

9. The process of claim 4 wherein at least about 25% of the cellulosic fibers are sized with a water repellent material.

10. The process of claim 4 wherein at least about 25% of the cellulosic fibers are not sized.

11. The process of claim 4 further including from about 5% to about 15% by weight of a binder.

12. A method of removing a liquid hydrocarbon from the surface of an aqueous body comprising:
a. contacting the liquid hydrocarbon with a sorbent material said sorbent material comprising from about 25% to about 95% by weight polymeric fiber and from about 5% to about 75% by weight cellulosic fiber;
b. separating the sorbent material with the sorbed hydrocarbon liquid from the aqueous liquid.

* * * * *